US012786965B2

(12) United States Patent
Wang

(10) Patent No.: US 12,786,965 B2
(45) Date of Patent: Nov. 3, 2026

(54) METHOD, DEVICE AND COMPUTER STORAGE MEDIUM OF COMMUNICATION

(71) Applicant: NEC CORPORATION, Tokyo (JP)

(72) Inventor: Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 771 days.

(21) Appl. No.: 17/915,795

(22) PCT Filed: Apr. 2, 2020

(86) PCT No.: PCT/CN2020/082999
§ 371 (c)(1),
(2) Date: Sep. 29, 2022

(87) PCT Pub. No.: WO2021/196129
PCT Pub. Date: Oct. 7, 2021

(65) Prior Publication Data
US 2023/0319890 A1 Oct. 5, 2023

(51) Int. Cl.
*H04W 72/0453* (2023.01)
*H04W 74/0833* (2024.01)
(Continued)

(52) U.S. Cl.
CPC ... *H04W 72/0453* (2013.01); *H04W 74/0833* (2013.01); *H04W 74/0836* (2024.01); *H04W 74/0838* (2024.01)

(58) Field of Classification Search
CPC ...................... H04W 74/0833; H04W 72/0453
See application file for complete search history.

(56) References Cited

U.S. PATENT DOCUMENTS

2012/0099441 A1 4/2012 Jung et al.
2017/0099660 A1 4/2017 Oh
(Continued)

FOREIGN PATENT DOCUMENTS

WO 2019/050789 A1 3/2019
WO 2019/160311 A1 8/2019
(Continued)

OTHER PUBLICATIONS

Japanese Office Action dated Jan. 16, 2024 in Application No. 2022-559362.
(Continued)

*Primary Examiner* — Saad A. Waqas
(74) *Attorney, Agent, or Firm* — Sughrue Mion, PLLC

(57) ABSTRACT

Embodiments of the present disclosure relate to methods, devices and computer readable media of communication. A method of communication implemented by a terminal device comprises in accordance with a determination that uplink data is to be transmitted in an inactive state, determining configuration parameters for transmission of the uplink data; determining, based on the configuration parameters, a target random access procedure for transmission of the uplink data in an inactive state of the terminal device; and transmitting, based on the target random access procedure, the uplink data to a network device in the inactive state. A method of communication implemented by a network device comprises receiving uplink data transmitted by a terminal device in an inactive state based on a target random access procedure, the target random access procedure being determined based on configuration parameters, the configuration parameters being determined upon determination that uplink data is to be transmitted in the inactive state; and transmitting, to the terminal device, a response to
(Continued)

the reception of the uplink data. In this way, control scheme for small data transmission based on RACH is provided.

6 Claims, 14 Drawing Sheets

(51) Int. Cl.
*H04W 74/0836* (2024.01)
*H04W 74/0838* (2024.01)

(56) References Cited

U.S. PATENT DOCUMENTS

| | | | | |
|---|---|---|---|---|
| 2018/0205516 | A1 | 7/2018 | Jung et al. | |
| 2018/0279376 | A1 | 9/2018 | Dinan et al. | |
| 2019/0261234 | A1 | 8/2019 | Park et al. | |
| 2019/0350034 | A1 | 11/2019 | Choe et al. | |
| 2020/0068442 | A1* | 2/2020 | Lee | H04W 74/004 |
| 2020/0100297 | A1 | 3/2020 | Agiwal et al. | |
| 2021/0259021 | A1* | 8/2021 | Huang | H04W 74/0833 |

FOREIGN PATENT DOCUMENTS

| | | | | |
|---|---|---|---|---|
| WO | 2020/034560 A1 | 2/2020 | | |
| WO | WO-2020034319 A1 * | 2/2020 | | H04W 74/002 |

OTHER PUBLICATIONS

LG Electronics Inc., "Consideration on overall SDT procedure", 3GPP TSG-RAN2#114-e, R2-2105597, May 19-27, 2021, Online, pp. 1-6 (7 pages total).

Intel Corporation, "Failure and successful handling for an SDT session", 3GPP TSG RAN WG2 Meeting #114, R2-2104881, May 19-27, 2021, Electronic Meeting (17 pages total).

Sharp, "Fallback issue for 2-step RA based small data transmission", 3GPP TSG-RAN WG2 Meeting #113 bis electronic, R2-2102847, Apr. 12-20, 2021, Online, pp. 1-2 (3 pages total).

Office Action issued Oct. 3, 2023 in Japanese Application No. 2022-559362.

Huawei, Hisilicon, "MsgA resource configuration and selection", 3GPP TSG-RAN WG2 Meeting 107bis, R2-1913007, Oct. 14-18, 2019, 4 pgs., Chongqing, China.

"Status Report to TSG", 3GPP TSG RAN meeting #86, RP-192414, Dec. 9-12, 2019, 32 pgs., Sitges, Spain.

International Search Report for PCT/CN2020/082999 dated, Dec. 28, 2020 (PCT/ISA/210).

Written Opinion of the International Searching Authority for PCT/CN2020/082999 dated, Dec. 28, 2020 (PCT/ISA/237).

JP Office Action for Japanese Patent Application No. 2022-559362, mailed on Jun. 4, 2024 with English Translation.

Extended European Search Report dated Apr. 4, 2023 in European Application No. 20928225.0.

* cited by examiner

METHOD, DEVICE AND COMPUTER STORAGE MEDIUM OF COMMUNICATION

CROSS REFERENCE TO RELATED APPLICATIONS

This application is a National Stage of International Application No. PCT/CN2020/082999 filed Apr. 2, 2020.

TECHNICAL FIELD

Embodiments of the present disclosure generally relate to the field of telecommunication, and in particular, to methods, devices and computer storage media of communication for small data transmission (SDT) based on a random access channel (RACH).

BACKGROUND

Typically, a terminal device in an inactive state may still have small and infrequent data traffic to be transmitted (also referred to as SDT hereinafter). Until the third generation partnership project (3GPP) Release 16, the inactive state cannot support data transmission, and the terminal device has to resume the connection for any downlink and uplink data. Connection setup and subsequently release to the inactive state happens for each data transmission whatever small and infrequent the data packets are. This will result in unnecessary power consumption and signaling overhead.

In this event, 3GPP new radio (NR) Release 17 has approved SDT based on a RACH in the inactive state. As known, in addition to a 4-step random access procedure, NR also involves a 2-step random access procedure. Thus, how to perform SDT in consideration with the 2-step and 4-step random access procedures has become a hot issue.

SUMMARY

In general, embodiments of the present disclosure provide methods, devices and computer storage media of communication for SDT based on a RACH.

In a first aspect, there is provided a method of communication. The method comprises: in accordance with a determination that uplink data is to be transmitted in an inactive state of a terminal device, determining, at the terminal device, configuration parameters for transmission of the uplink data; determining, based on the configuration parameters, a target random access procedure for transmission of the uplink data in an inactive state of the terminal device; and transmitting, based on the target random access procedure, the uplink data to a network device in the inactive state.

In a second aspect, there is provided a method of communication. The method comprises: receiving, at a network device, uplink data transmitted by a terminal device in an inactive state based on a target random access procedure, the target random access procedure being determined based on configuration parameters, the configuration parameters being determined upon determination that uplink data is to be transmitted in the inactive state; and transmitting, to the terminal device, a response to the reception of the uplink data.

In a third aspect, there is provided a terminal device. The terminal device comprises a processor and a memory coupled to the processor. The memory stores instructions that when executed by the processor, cause the terminal device to perform the method according to the first aspect of the present disclosure.

In a fourth aspect, there is provided a network device. The network device comprises a processor and a memory coupled to the processor. The memory stores instructions that when executed by the processor, cause the network device to perform the method according to the second aspect of the present disclosure.

In a fifth aspect, there is provided a computer readable medium having instructions stored thereon. The instructions, when executed on at least one processor, cause the at least one processor to perform the method according to the first aspect of the present disclosure.

In a sixth aspect, there is provided a computer readable medium having instructions stored thereon. The instructions, when executed on at least one processor, cause the at least one processor to perform the method according to the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
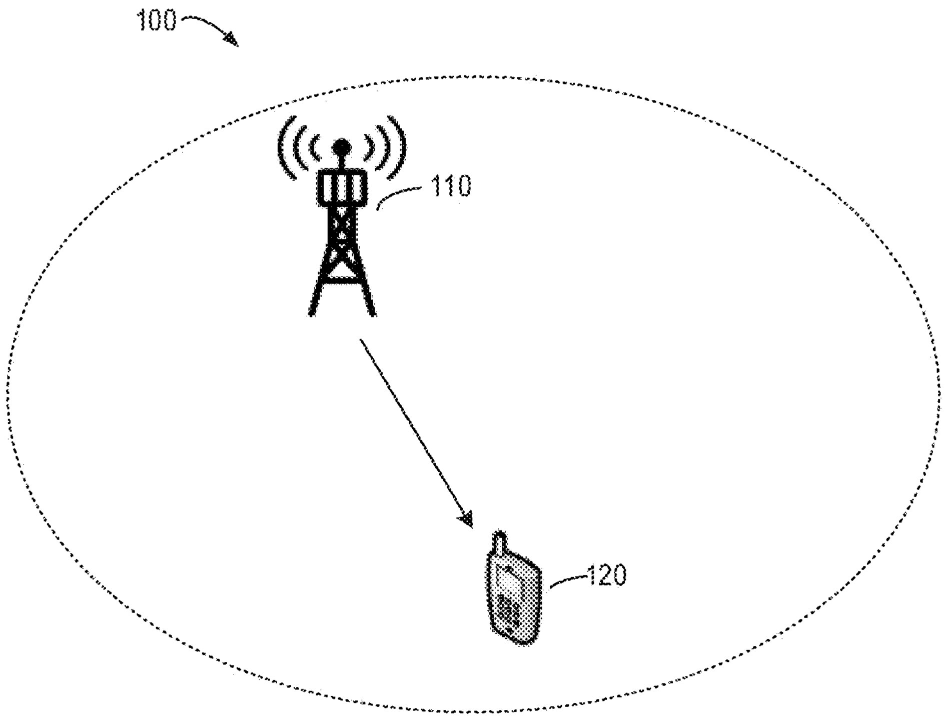
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an evolved NodeB (eNodeB or eNB), a next generation NodeB (gNB), a transmission reception point (TRP), a remote radio unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different RATs. In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

FIG. 1 illustrates a schematic diagram of an example communication network 100 in which embodiments of the present disclosure can be implemented. As shown in FIG. 1, the communication network 100 may include a network device 110 and a terminal device 120 served by the network device 110. The network device 110 and the terminal device 120 may communicate with each other via a channel such as a wireless communication channel. For example, the terminal device 120 may transmit data packets (i.e., uplink data) to the network device 110, and the network device 110 may transmit a response to reception of the uplink data to the terminal device 120.

It is to be understood that the number and type of devices in FIG. 1 are given for the purpose of illustration without suggesting any limitations to the present disclosure. The communication network 100 may include any suitable number of network devices and/or terminal devices adapted for implementing implementations of the present disclosure. Further, the communication network 100 may include any other devices than the network devices and the terminal devices, such as a core network element, but they are omitted here so as to avoid obscuring the present invention.

The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As mentioned above, the terminal device 120 in an inactive state may still have small and infrequent data traffic to be transmitted (also referred to as SDT hereinafter). In some embodiments, the small and infrequent data traffic may include smartphone applications such as traffic from instant messaging (IM) services (whatsapp, QQ, wechat etc.), heart-beat/keep-alive traffic from IM/email clients and other applications, and push notifications from various applications. In some embodiments, the small and infrequent data traffic may include non-smartphone applications such as traffic from wearables (periodic positioning information etc.), sensors (industrial Wireless Sensor Networks transmitting temperature, pressure readings periodically or in an event triggered manner etc.), and smart meters and smart meter networks sending periodic meter readings.

Currently, a RACH-based scheme has been approved to perform SDT in an inactive of a terminal device. As NR involves both a 2-step random access procedure and a 4-step random access procedure, how to perform SDT in consideration with the 2-step and 4-step random access procedures has become a hot issue. Embodiments of the present disclosure provide a solution of communication for SDT based on RACH. The solution can achieve control of SDT in consideration with a 2-step random access procedure and a 4-step random access procedure. Principles and implementations of the present disclosure will be described in detail below with reference to the figures.

Figure 2:
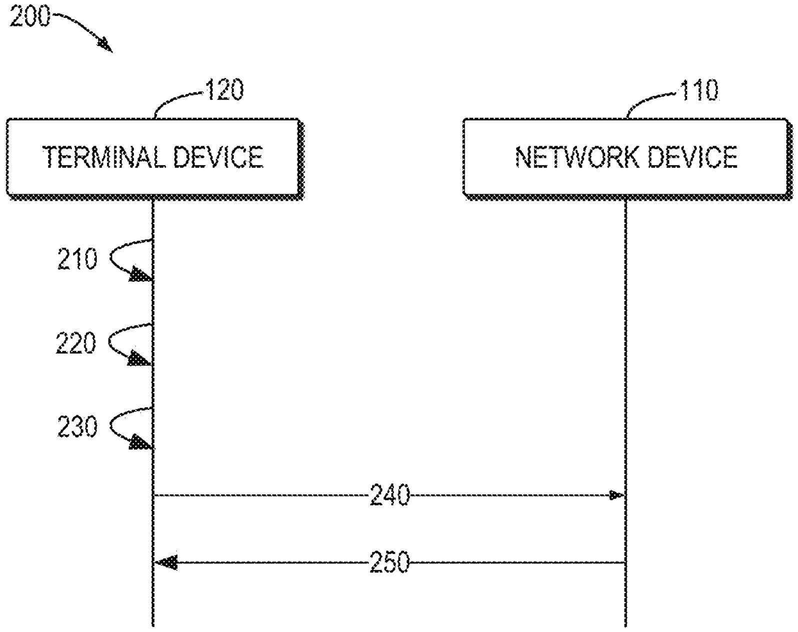
FIG. 2 illustrates a schematic diagram illustrating a process of communication for SDT based on a RACH according to some embodiments of the present disclosure.

FIG. 2 illustrates a schematic diagram illustrating a process 200 of communication for SDT based on RACH according to some embodiments of the present disclosure. For the purpose of discussion, the process 200 will be described with reference to FIG. 1. The process 200 may involve the terminal device 120 and the network device 110 as illustrated in FIG. 1.

In case that the terminal device 120 in an inactive state has data packets (i.e., uplink data) to be transmitted, as shown in FIG. 2, the terminal device 120 determines 210 whether the uplink data is to be transmitted in an inactive state. In some embodiments, the terminal device 120 may determine whether a size of buffered content associated with the uplink data is less than or equal to a threshold size. That is, the terminal device 120 may check the actual data size, i.e., the size of the buffered content. In some embodiments, the buffered content may refer to total uplink data and signaling available for transmission plus media access control (MAC) header and where required, MAC control elements (CE).

In some embodiments, the threshold size is the maximum buffer size for SDT. The threshold size is a threshold and may be determined in any suitable way. In some embodiments, the threshold size may be broadcasted by system information from the network device 110. In some alternative embodiments, the threshold size may be a predetermined value. In some alternative embodiments, the threshold size that support SDT may be configured to the terminal device 120.

If determining that the size of the buffered content is larger than the threshold size, the terminal device 120 may cancel the transmission of the uplink data in an inactive state. In some embodiments, if determining, at a MAC layer of the terminal device 120, that the size of the buffered content is larger than the threshold size, the MAC layer may indicate the cancel to the upper layer (i.e., a radio resource control (RRC) layer of the terminal device 120). Upon receiving the indication of the cancel by the lower layer (i.e., MAC layer), the RRC layer may initiate normal data transmission (NDT). In this case, the terminal device 120 may transmit the uplink data in a connected state.

It should be noted that the above is merely an example, any other suitable ways are also feasible to determine whether the uplink data is to be transmitted in the inactive state.

If determining that the uplink data is to be transmitted in the inactive state, the terminal device 120 determines 220 configuration parameters for transmission of the uplink data. In some embodiments, determining the configuration parameters may comprise a selection between a normal uplink (NUL) and a supplement uplink (SUL) for the transmission of the uplink data, and a selection of a bandwidth part (BWP) for the selected uplink. The SUL may be configured to improve UL coverage for high frequency scenarios. With the SUL, the terminal device 120 may be configured with 2 ULs for one DL of the same cell. The SUL can be used when the terminal device 120 is at the edge of a cell, and the NUL can be used when the terminal device 120 is at the center of the cell. According to embodiments of the present disclosure, the actual size of the uplink data is checked before the determination of the configuration parameters. In this way, efficiency data transmission can be achieved without unnecessary resource waste.

Figure 17:
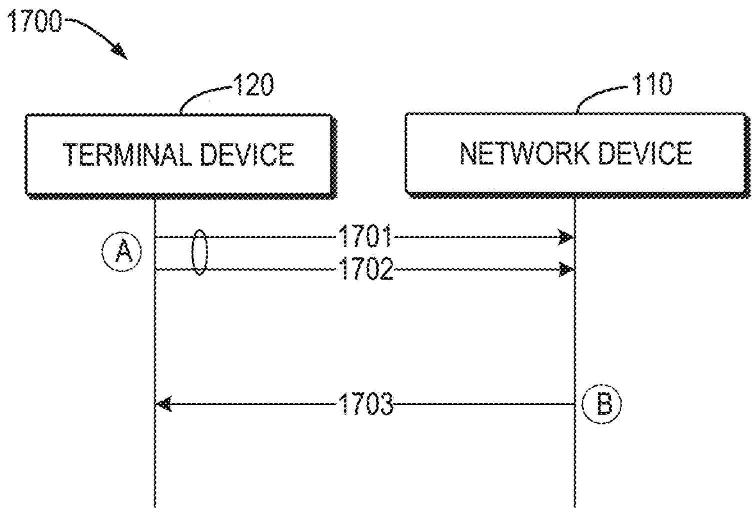
FIG. 17 illustrates a schematic diagram of a 2-step random access procedure according to some embodiments of the present disclosure.

Based on the determined configuration parameters, the terminal device 120 determines 230 a target random access procedure for transmission of the uplink data in the inactive state. In some embodiments, the target random access procedure may be a 2-step random access procedure. In some embodiments, the 2-step random access procedure may be a contention based random access procedure. FIG. 17 illustrates a schematic diagram 1700 of a 2-step random access procedure according to some embodiments of the present disclosure. As shown in FIG. 17, the 2-step random access procedure may involve transmission of a message A (msgA) from the terminal device 120 to the network device 110 and transmission of a message B (msgB) from the network device 110 to the terminal device 120 as a response to the message A. The message A may comprise random access preamble transmission 1701 and PUSCH payload transmission 1702 of the random access procedure for 2-step random access (RA) type. The message B may consist of a response 1703 for one or more of contention resolution, fallback indication and backoff indication.

Figure 18:
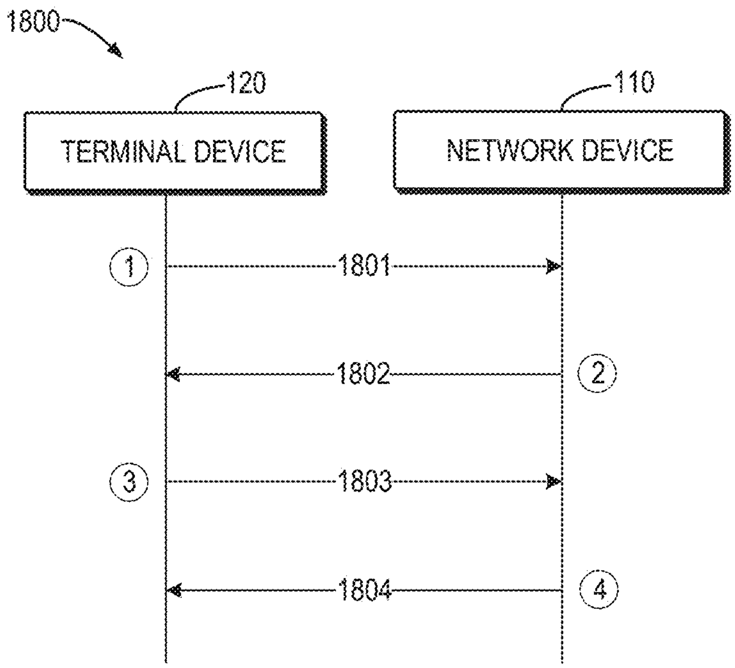
FIG. 18 illustrates a schematic diagram of a 4-step random access procedure according to some embodiments of the present disclosure.

In some embodiments, the target random access procedure may be a 4-step random access procedure. In some embodiments, the 4-step random access procedure may be a contention based random access procedure. FIG. 18 illustrates a schematic diagram 1800 of a 4-step random access procedure according to some embodiments of the present disclosure. As shown in FIG. 18, the 4-step random access procedure may involve transmission of a message 1 (msg1) and a message 3 (msg3) from the terminal device 120 to the network device 110 and transmission of a message 2 (msg2)

and a message 4 (msg4) from the network device 110 to the terminal device 120 as a response to the message 1 and 3 respectively. The message 1 may comprise random access preamble transmission 1801 of the random access procedure for 4-step RA type. The message 2 may comprise a random access response (RAR) 1802. The RAR may comprise configured grant information for data transmission. The message 3 may comprise first scheduled transmission 1803 of the random access procedure. The message 4 may consist of a response 1804 for one or more of contention resolution, fallback indication and backoff indication.

According to embodiments of the present disclosure, the determination of the target random access procedure can be made based on a random access resource configuration and a packet size for SDT in 2-step and 4-step random access procedures.

Random Access Resource Configuration for SDT

In some embodiment, a dedicated RACH resource may be configured for SDT in a 2-step random access procedure and a 4-step random access procedure respectively. That is, SDT is not shared with NDT in the RACH resource. Here, the RACH resource refers to resources associated with RACH transmission. For example, the RACH resource may comprise at least one of time and frequency resource and preamble resource. It should be noted that any other resources associated with RACH transmission can also be included. In some embodiments, the dedicated RACH resource may be a set of resources and the resources in the set are associated with different uplink grant sizes. In this way, flexible payload sizes can be enabled.

In some additional or alternative embodiments, a dedicated physical uplink shared channel (PUSCH) resource may be configured for SDT in Message A of a 2-step random access procedure. That is, SDT is not shared with NDT in the PUSCH resource for Message A of a 2-step random access procedure. In some embodiments, the dedicated PUSCH resource may be a set of resources and the resources in the set are associated with different uplink grant sizes. In this way, flexible payload sizes can also be enabled.

With a dedicated random access resource for SDT, the network device 110 can be indicated that this is an SDT transmission.

In some alternative embodiments for a 2-step random access procedure, random access resources can be shared between SDT and NDT. In some embodiments, at least one of the RACH resource and the PUSCH resource can be shared between SDT and NDT. In this way, shared random access resource is more radio resource efficient, and radio resource can be saved.

Packet Size for SDT

As discussed above, dedicated random resources corresponding to different uplink grant sizes may be configured by the network device 110. The terminal device 120 may determine a packet size for SDT in order to select one appropriate random resource therefrom. Here, the packet size may refer to a size of a data packet first transmitted in SDT. If the uplink grant size is too large for the data packet, padding would be added and thus power consumption would increase. If the uplink grant size is too small, multiple transmission would be needed. In view of this, according to embodiments of the present disclosure, the terminal device 120 may determine the packet size for SDT upon initiating SDT.

In some embodiments, the terminal device 120 may receive the packet size from the network device 110. For example, information about the packet size may be broadcasted by system information from the network device 110. Alternatively, the information about the packet size may be configured to the terminal device 120 by a RRC message such as a RRCRelease message or any other suitable messages. Additionally, the packet size may be associated with at least one of an access category, an access identity, a QoS parameter (5QI), and a data radio bearer (DRB) for the uplink data.

In some alternative embodiments, the terminal device 120 may determine the packet size of the uplink data based on characteristics of traffic associated with the uplink data. In some embodiments, the RRC layer of the terminal device 120 may determine the packet size for the uplink data. For example, the RRC layer may determine the packet size based on characteristics of traffic, such as at least one of an access category, an access identity, a QoS parameter (5QI), and a data radio bearer (DRB) identity (ID) for the uplink data, and inform the lower layer (i.e., MAC layer) of the packet size, for example to assist determination of a target random access procedure. Alternatively, the MAC layer of the terminal device 120 may determine the packet size for the uplink data. For example, the MAC layer may receive assistance information about characteristics of traffic provided by the upper layer (i.e., RRC layer), such as at least one of an access category, an access identity, a QoS parameter (5QI), and a data radio bearer (DRB) identity (ID) for the uplink data, and determine the packet size based on the assistance information.

The MAC layer may utilize the packet size to assist determination of a target random access procedure. For example, the uplink grant size of a dedicated random access resource shall be equal to the packet size. Alternatively, the target random access procedure may be determined without the packet size. Details on the determination of the target random access procedure will be described later in connection with FIGS. 4-9B.

With reference to FIG. 2, upon determining 230 the target random access procedure, the terminal device 120 transmit 240 the uplink data based on the target random access procedure in the inactive state. For example, the terminal device 120 may determine random access resources for the target random access procedure, and transmit the uplink data on the determined resources. In some embodiments, the terminal device 120 may transmit the uplink data by means of a packet size. In some embodiments, the terminal device 120 may transmit the uplink data without a packet size. Details on the transmission of the uplink data will be described later in connection with FIGS. 10 and 11A-11B.

Upon receiving the uplink data, the network device 110 transmit 250, to the terminal device 120, a response to the reception of the uplink data. In some embodiments, the response may inform the terminal device 120 to suspend radio bearers for SDT transmission. In some embodiments, the response may inform the terminal device 120 of uplink grant information for subsequent transmission of the uplink data. It should be noted that any other suitable forms of the response are also feasible.

Corresponding to the process described with above, embodiments of the present disclosure provide methods of communication implemented at a terminal device and a network device respectively. It will be described in more details with reference to FIGS. 3-15.

Figure 3:
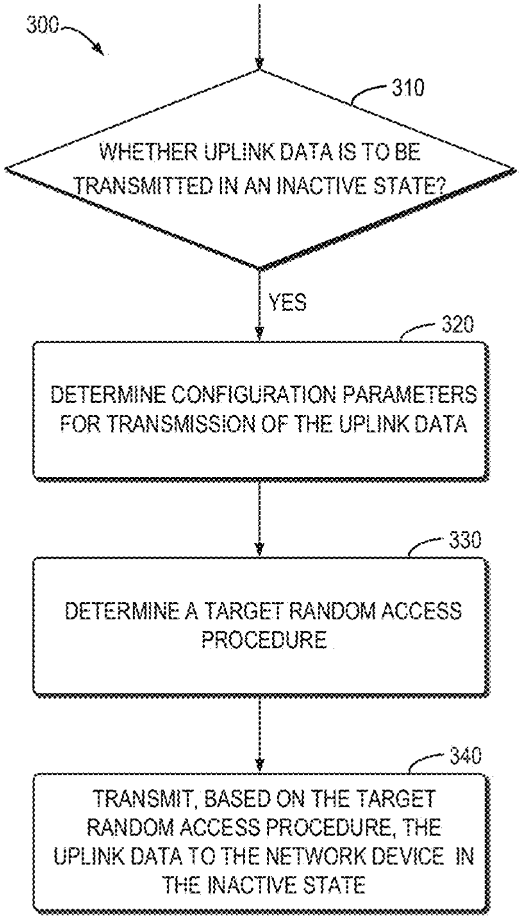
FIG. 3 illustrates an example method of communication implemented at a terminal device in accordance with some embodiments of the present disclosure.

FIG. 3 illustrates an example method 300 of communication implemented at a terminal device in accordance with some embodiments of the present disclosure. For example, the method 300 may be performed at the terminal device 120 as shown in FIG. 1. For the purpose of discussion, in the following, the method 300 will be described with reference to FIG. 1. It is to be understood that the method 300 may include additional blocks not shown and/or may omit some blocks as shown, and the scope of the present disclosure is not limited in this regard.

As shown in FIG. 3, at block 310, the terminal device 120 determines whether uplink data is to be transmitted in an inactive state. In this way, whether SDT is to be initiated can be checked. If determining at block 310 that the uplink data is to be transmitted in an inactive state, at block 320, the terminal device 120 determines configuration parameters for transmission of the uplink data. In some embodiments, the terminal device 120 may perform a selection between a NUL and a SUL for the transmission of the uplink data, and select a BWP for the selected uplink. It should be noted that any other suitable configuration parameters related to uplink selection and bandwidth selection may also be determined. The operations at block 310 are similar with that described at 210 in connection with FIG. 2, and other details are not repeated here.

At block 330, the terminal device 120 may determine a target random access procedure based on the configured parameters. The terminal device 120 may determine whether a 2-step or a 4-step random access procedure is used under the configuration parameters. In some embodiments, the determination of the target random access procedure may be performed based on a random access resource and a packet size for SDT in 2-step and 4-step random access procedures. It will be described in details in connection with FIGS. 4-6B later. In some embodiments, the terminal device 120 may receive, from the network device 110, information about the packet size of the uplink data. In some alternative embodiments, the terminal device 120 may determine the packet size of the uplink data based on characteristics of traffic associated with the uplink data. In some additional embodiments, the packet size is associated with at least one of an access category, an access identity, a QoS parameter, and a data radio bearer for the uplink data.

In some alternative embodiments, the determination of the target random access procedure at block 330 may be performed based on a random access resource and a size of a common control channel (CCCH) message for SDT in 2-step and 4-step random access procedures. It will be described in details in connection with FIGS. 7-9B later. The operations at block 330 are similar with that described at 230 in connection with FIG. 2, and other details are not repeated here.

At block 340, the terminal device 120 transmits, based on the target random access procedure, the uplink data to a network device 110 in the inactive state. For example, the terminal device 120 may determine random access resources for the target random access procedure, and transmit the uplink data on the determined resources. In some embodiments, the terminal device 120 may transmit the uplink data by means of a packet size. Its details will be described later in connection with FIG. 10. In some embodiments, the terminal device 120 may transmit the uplink data without a packet size. Its details will be described later in connection with FIGS. 11A-11B. The operations at block 340 are similar with that described at 240 in connection with FIG. 2, and other details are not repeated here.

Determination of Target Random Access Procedure with Packet Size

Figure 4:
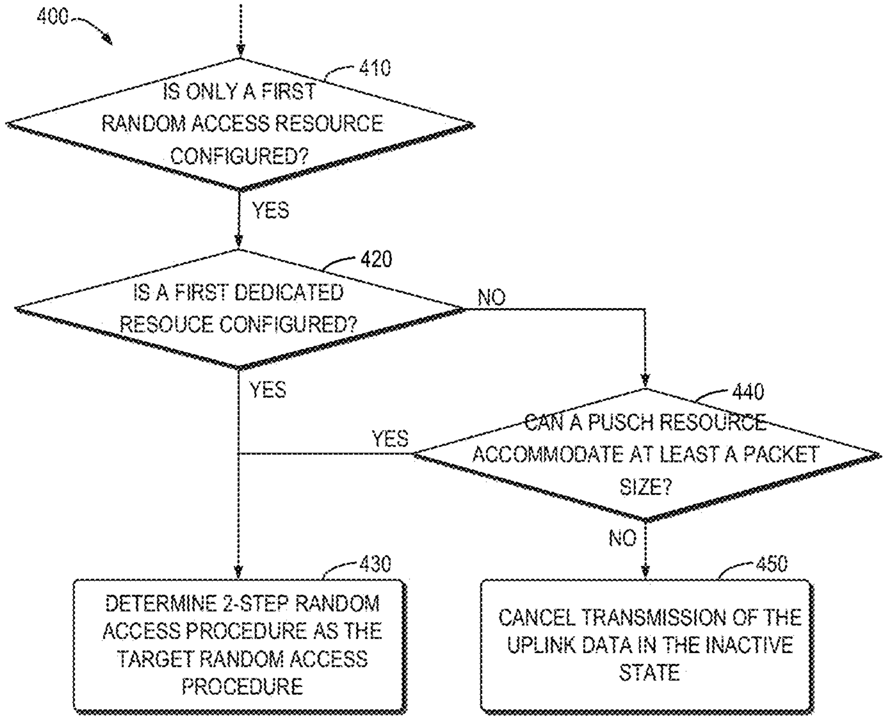
FIG. 4 illustrates an example method of determining a target random access procedure with a packet size in accordance with some embodiments of the present disclosure.

FIG. 4 illustrates an example method 400 of determining a target random access procedure with a packet size in accordance with some embodiments of the present disclosure. For example, the method 400 may be performed at the terminal device 120 as shown in FIG. 1. For the purpose of discussion, in the following, the method 400 will be described with reference to FIG. 1. It is to be understood that the method 400 may include additional blocks not shown and/or may omit some blocks as shown, and the scope of the present disclosure is not limited in this regard. This embodiment is described mainly for the case that a random access resource for a 2-step random access procedure is configured, especially for the case that only a random access resource for a 2-step random access procedure is configured.

As shown in FIG. 4, at block 410, the terminal device 120 determine whether a random access resource (also referred to as a first random access resource herein) for a 2-step random access procedure is configured for a selected BWP. In some embodiments, if only the first random access resource is configured, the terminal device 120 may determine the first random access resource is configured.

If the first random access resource is configured, at block 420, the terminal device 120 may determine whether a dedicated resource (also referred to as a first dedicated resource herein) in the first random access resource is configured for the transmission of the uplink data in the inactive state (i.e., SDT). In some embodiments, the terminal device 120 may determine whether the first dedicated resource has a size corresponding to a packet size for SDT, and if determining that the first dedicated resource has the size corresponding to the packet size, the terminal device 120 may determine the first dedicated resource is configured. It should be noted that this is merely an example, any other suitable ways for determining whether the first dedicated resource is configured are also feasible.

If determining at block 420 that the first dedicated resource is configured, at block 430, the terminal device 120 may determine a 2-step random access procedure as the target random access procedure. If determining at block 420 that the first dedicated resource is not configured, at block 440, the terminal device 120 may determine whether a PUSCH resource for a 2-step random access procedure for the selected BWP can accommodate at least the packet size.

If determining at block 440 that the PUSCH resource can accommodate at least the packet size, the terminal device 120 may determine a 2-step random access procedure as the target random access procedure. If determining at block 440 that the PUSCH resource cannot accommodate at least the packet size, at block 450, the terminal device 120 may cancel transmission of the uplink data in the inactive state.

Figure 5:
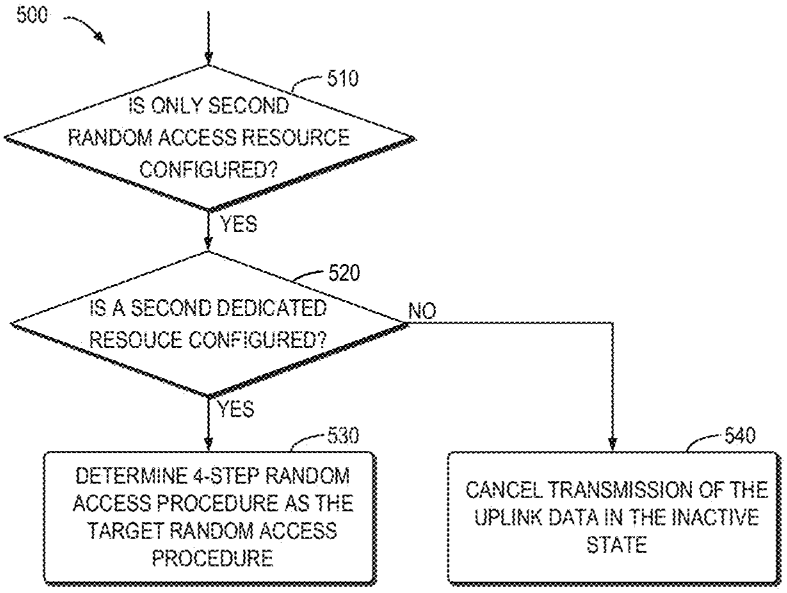
FIG. 5 illustrates another example method of determining a target random access procedure with a packet size in accordance with some embodiments of the present disclosure.

FIG. 5 illustrates another example method 500 of determining a target random access procedure with a packet size in accordance with some embodiments of the present disclosure. For example, the method 500 may be performed at the terminal device 120 as shown in FIG. 1. For the purpose of discussion, in the following, the method 500 will be described with reference to FIG. 1. It is to be understood that the method 500 may include additional blocks not shown and/or may omit some blocks as shown, and the scope of the present disclosure is not limited in this regard. This embodiment is described mainly for the case that a random access resource for a 4-step random access procedure is configured, especially for the case that only a random access resource for a 4-step random access procedure is configured.

As shown in FIG. 5, at block 510, the terminal device 120 determine whether a random access resource (also referred to as a second random access resource herein) for a 4-step random access procedure is configured for a selected BWP. In some embodiments, if only the second random access resource is configured, the terminal device 120 may determine the second random access resource is configured.

If the second random access resource is configured, at block 520, the terminal device 120 may determine whether a dedicated resource (also referred to as a second dedicated resource herein) in the second random access resource is configured for the transmission of the uplink data in the inactive state (i.e., SDT). In some embodiments, the terminal device 120 may determine whether the second dedicated resource has a size corresponding to a packet size for SDT, and if determining that the second dedicated resource has the size corresponding to the packet size, the terminal device 120 may determine the second dedicated resource is configured. It should be noted that this is merely an example, any other suitable ways for determining whether the second dedicated resource is configured are also feasible.

If determining at block 520 that the second dedicated resource is configured, at block 530, the terminal device 120 may determine a 4-step random access procedure as the target random access procedure. If determining at block 520 that the second dedicated resource is not configured, at block 540, the terminal device 120 may cancel transmission of the uplink data in the inactive state.

Figure 6A:
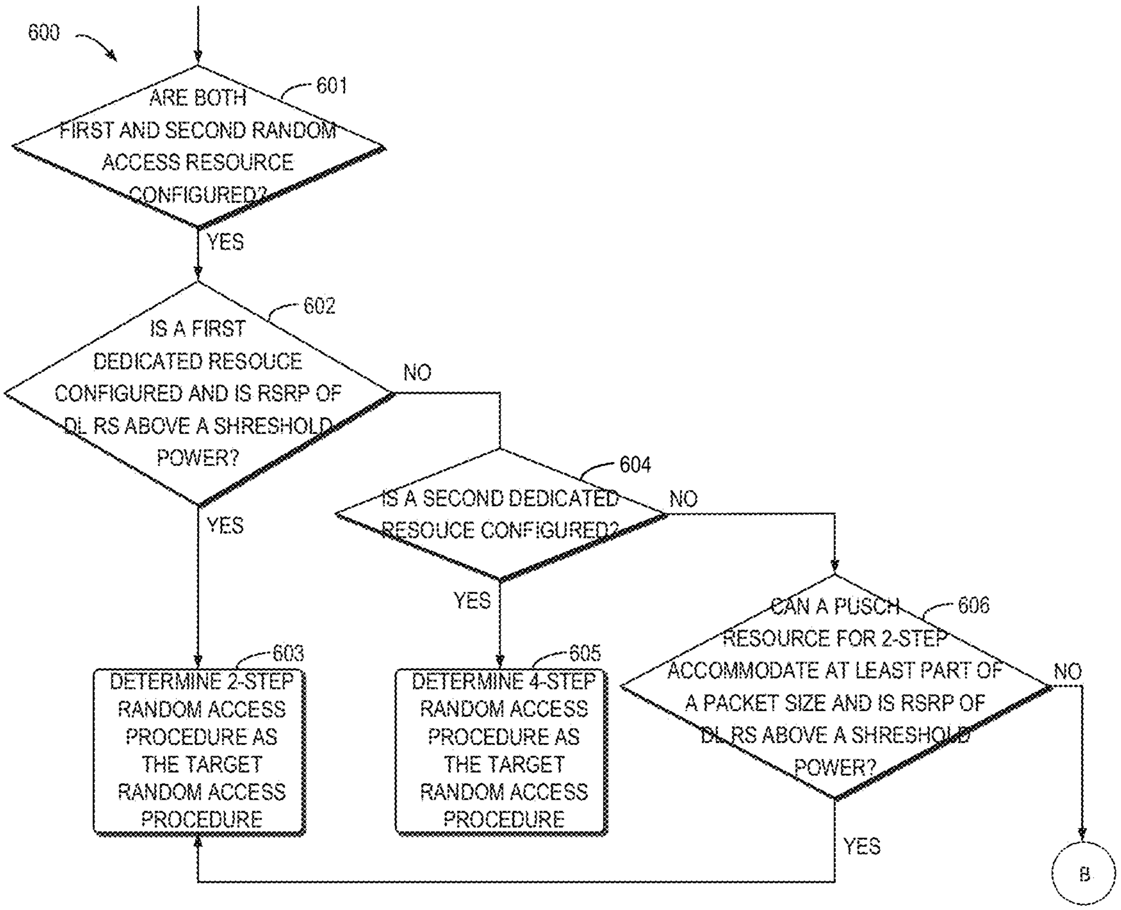
FIG. 6A-6B illustrate another example method of determining a target random access procedure with a packet size in accordance with some embodiments of the present disclosure.
Figure 6B:
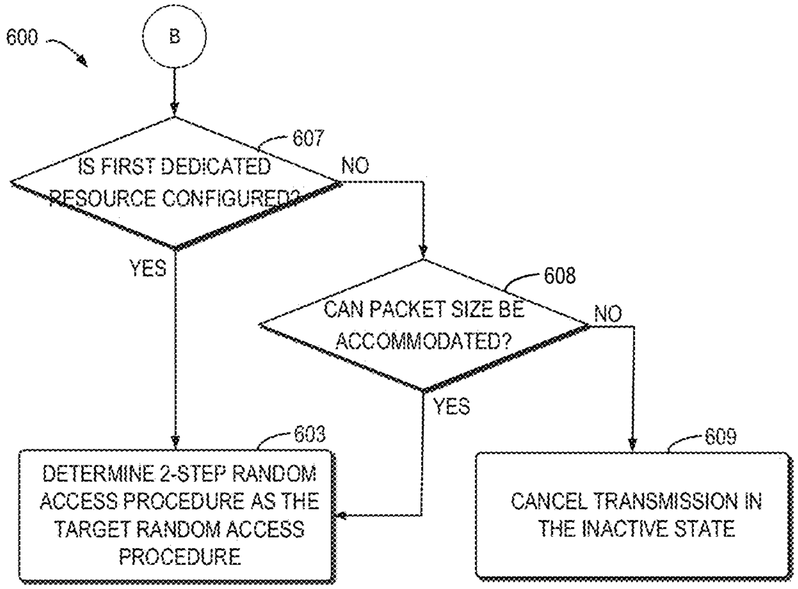

FIGS. 6A-6B illustrate another example method 600 of determining a target random access procedure with a packet size in accordance with some embodiments of the present disclosure. For example, the method 600 may be performed at the terminal device 120 as shown in FIG. 1. For the purpose of discussion, in the following, the method 600 will be described with reference to FIG. 1. It is to be understood that the method 600 may include additional blocks not shown and/or may omit some blocks as shown, and the scope of the present disclosure is not limited in this regard. This embodiment is described mainly for the case that both a first random access resource for a 2-step random access procedure and a second random access resource for a 4-step random access procedure are configured.

As shown in FIG. 6A, at block 601, the terminal device 120 may determine whether both a first random access resource for a 2-step random access procedure and a second random access resource for a 4-step random access procedure are configured for a selected BWP. If determining that both the first and second random access resources are configured, at block 602, the terminal device 120 may determine whether a first dedicated resource in the first random access resource is configured for the transmission of the uplink data in the inactive state and reference signal receiving power (RSRP) of a downlink reference signal (DL RS) is above a threshold power. The threshold power is a threshold, and can be determined in any suitable ways.

In some embodiments, the terminal device 120 may determine whether the first dedicated resource has a size corresponding to the packet size, and if determining that the first dedicated resource has the size corresponding to the packet size, the terminal device 120 may determine the first dedicated resource is configured. It should be noted that this is merely an example, any other suitable ways for determining whether the first dedicated resource is configured are also feasible.

If determining at block 602 that the first dedicated resource is configured and the RSRP is above the threshold power, at block 603, the terminal device 120 may determine a 2-step random access procedure as the target random access procedure. If determining at block 602 that the first dedicated resource is not configured or the RSRP is below the threshold power, at block 604, the terminal device 120 may determine whether a second dedicated resource in the second random access resource is configured for the transmission of the uplink data in the inactive state.

In some embodiments, the terminal device 120 may determine whether the second dedicated resource has a size corresponding to the packet size, and if determining that the second dedicated resource has the size corresponding to the packet size, the terminal device 120 may determine the second dedicated resource is configured. It should be noted that this is merely an example, any other suitable ways for determining whether the second dedicated resource is configured are also feasible.

If determining at block 604 that the second dedicated resource is configured, at block 605, the terminal device may determine a 4-step random access procedure as the target random access procedure. If determining at block 604 that the second dedicated resource is not configured, at block 606, the terminal device 120 may determine whether a PUSCH resource for a 2-step random access procedure for the selected BWP can accommodate at least part of the packet size and the RSRP of the downlink reference signal is above the threshold power.

If determining at block 606 that the PUSCH resource can accommodate at least part of the packet size and the RSRP is above the threshold power, the process may enter block 603 in which the terminal device 120 may determine a 2-step random access procedure as the target random access procedure. If determining at block 606 that the PUSCH resource for the 2-step random access procedure for the selected BWP cannot accommodate at least part of the packet size of the uplink data or the RSRP is below the threshold power, as shown in FIG. 6B, terminal device 120 may determine, at block 607, whether a first dedicated resource in the first random access resource is configured for the transmission of the uplink data in the inactive state.

In some embodiments, the terminal device 120 may determine whether the first dedicated resource has a size corresponding to the packet size, and if determining that the first dedicated resource has the size corresponding to the packet size, the terminal device 120 may determine the first dedicated resource is configured. It should be noted that this is merely an example, any other suitable ways for determining whether the first dedicated resource is configured are also feasible.

If determining at block 607 that the first dedicated resource is configured, the process may enter block 603 in which the terminal device 120 may determine a 2-step random access procedure as the target random access procedure. If determining at block 607 that the first dedicated resource is not configured, at block 608, the terminal device 120 may determine whether a PUSCH resource for the 2-step random access procedure for the selected BWP can accommodate at least part of the packet size.

If determining at block 608 that the PUSCH resource can accommodate at least part of the packet size of the uplink data, the process may enter block 603 in which the terminal device 120 may determine a 2-step random access procedure as the target random access procedure. If determining at block 608 that the PUSCH resource cannot accommodate at least part of the packet size of the uplink data, at block 609, the terminal device 120 may cancel the transmission of the uplink data in the inactive state.

In an alternative embodiment, the operation at block 607 and the operation at block 608 can be reversed in order of the performance. That is, the determination at block 608 may be performed first and then the determination at block 607 is performed. It should be noted that the embodiments described in connection with FIGS. 4-6B are merely examples, and may be combined in any suitable ways for determination of a target random access procedure.

Determination of Target Random Access Procedure without Packet Size

Figure 7:
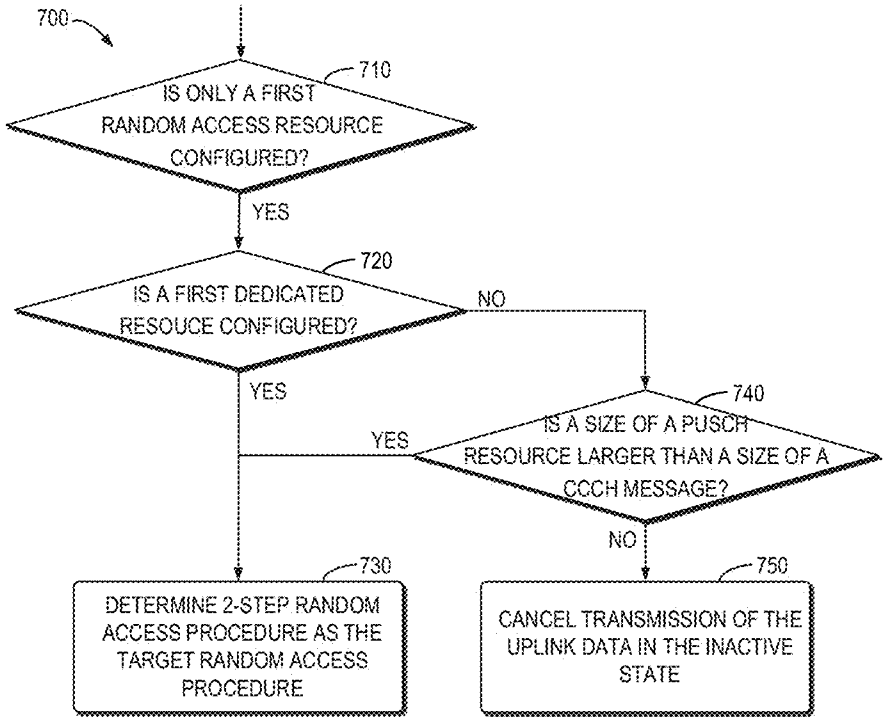
FIG. 7 illustrates an example method of determining a target random access procedure without a packet size in accordance with some embodiments of the present disclosure.

FIG. 7 illustrates an example method 700 of determining a target random access procedure without a packet size in accordance with some embodiments of the present disclosure. For example, the method 700 may be performed at the terminal device 120 as shown in FIG. 1. For the purpose of discussion, in the following, the method 700 will be described with reference to FIG. 1. It is to be understood that the method 700 may include additional blocks not shown and/or may omit some blocks as shown, and the scope of the present disclosure is not limited in this regard. This embodiment is described mainly for the case that a random access resource for a 2-step random access procedure is configured, especially for the case that only a random access resource for a 2-step random access procedure is configured.

As shown in FIG. 7, at block 710, the terminal device 120 determine whether a first random access resource for a 2-step random access procedure is configured for a selected BWP. In some embodiments, if only the first random access resource is configured, the terminal device 120 may determine the first random access resource is configured.

If the first random access resource is configured, at block 720, the terminal device 120 may determine whether a first dedicated resource in the first random access resource is configured for the transmission of the uplink data in the inactive state. Comparing with the operation at block 420 in FIG. 4, there is no any limitation for the size of the first dedicated resource in the operation at block 720.

If determining at block 720 that the first dedicated resource is configured, at block 730, the terminal device 120 may determine a 2-step random access procedure as the target random access procedure. If determining at block 720 that the first dedicated resource is not configured, at block 740, the terminal device 120 may determine whether a size of a PUSCH resource for a 2-step random access procedure for the selected BWP is larger than a size of a CCCH message. Comparing with the operation at block 440 in FIG. 4, instead of a packet size of the uplink data, a size of a CCCH message is used to assist determination of the target random access procedure in the operation at block 720.

If determining at block 740 that the size of the PUSCH resource is larger than that of the CCCH message, the terminal device 120 may determine a 2-step random access procedure as the target random access procedure. If determining at block 740 that the size of the PUSCH resource is larger than that of the CCCH message, at block 750, the terminal device 120 may cancel transmission of the uplink data in the inactive state.

In an alternative embodiment, the operation at block 720 and the operation at block 740 can be reversed in order of the performance. That is, the determination at block 740 may be performed first and then the determination at block 720 is performed.

Figure 8:
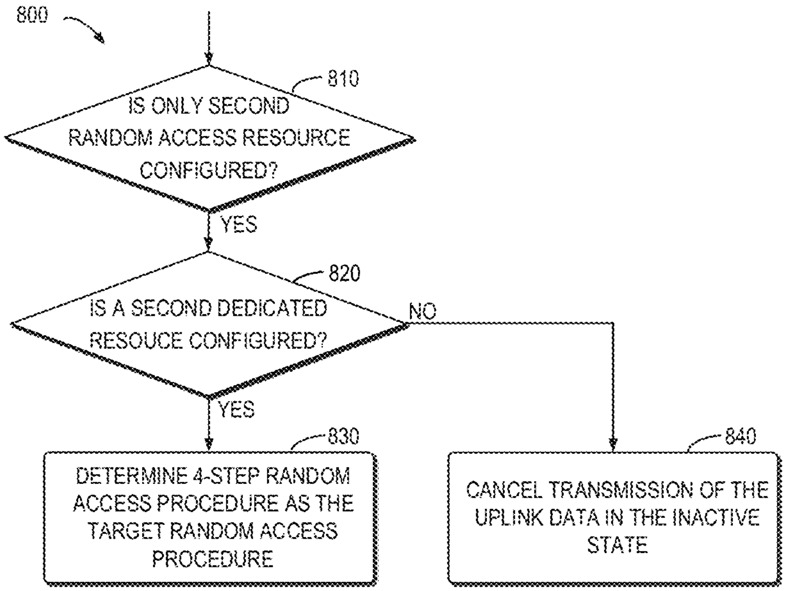
FIG. 8 illustrates another example method of determining a target random access procedure without a packet size in accordance with some embodiments of the present disclosure.

FIG. 8 illustrates another example method 800 of determining a target random access procedure without a packet size in accordance with some embodiments of the present disclosure. For example, the method 800 may be performed at the terminal device 120 as shown in FIG. 1. For the purpose of discussion, in the following, the method 800 will be described with reference to FIG. 1. It is to be understood that the method 800 may include additional blocks not shown and/or may omit some blocks as shown, and the scope of the present disclosure is not limited in this regard. This embodiment is described mainly for the case that a random access resource for a 4-step random access procedure is configured, especially for the case that only a random access resource for a 4-step random access procedure is configured.

As shown in FIG. 8, at block 810, the terminal device 120 determine whether a second random access resource for a 4-step random access procedure is configured for a selected BWP. In some embodiments, if only the second random access resource is configured, the terminal device 120 may determine the second random access resource is configured.

If the second random access resource is configured, at block 820, the terminal device 120 may determine whether a second dedicated resource in the second random access resource is configured for the transmission of the uplink data in the inactive state. Comparing with the operation at block 520 in FIG. 5, there is no any limitation for the size of the second dedicated resource in the operation at block 820.

If determining at block 820 that the second dedicated resource is configured, at block 830, the terminal device 120 may determine a 4-step random access procedure as the target random access procedure. If determining at block 820 that the second dedicated resource is not configured, at block 840, the terminal device 120 may cancel transmission of the uplink data in the inactive state.

Figure 9A:
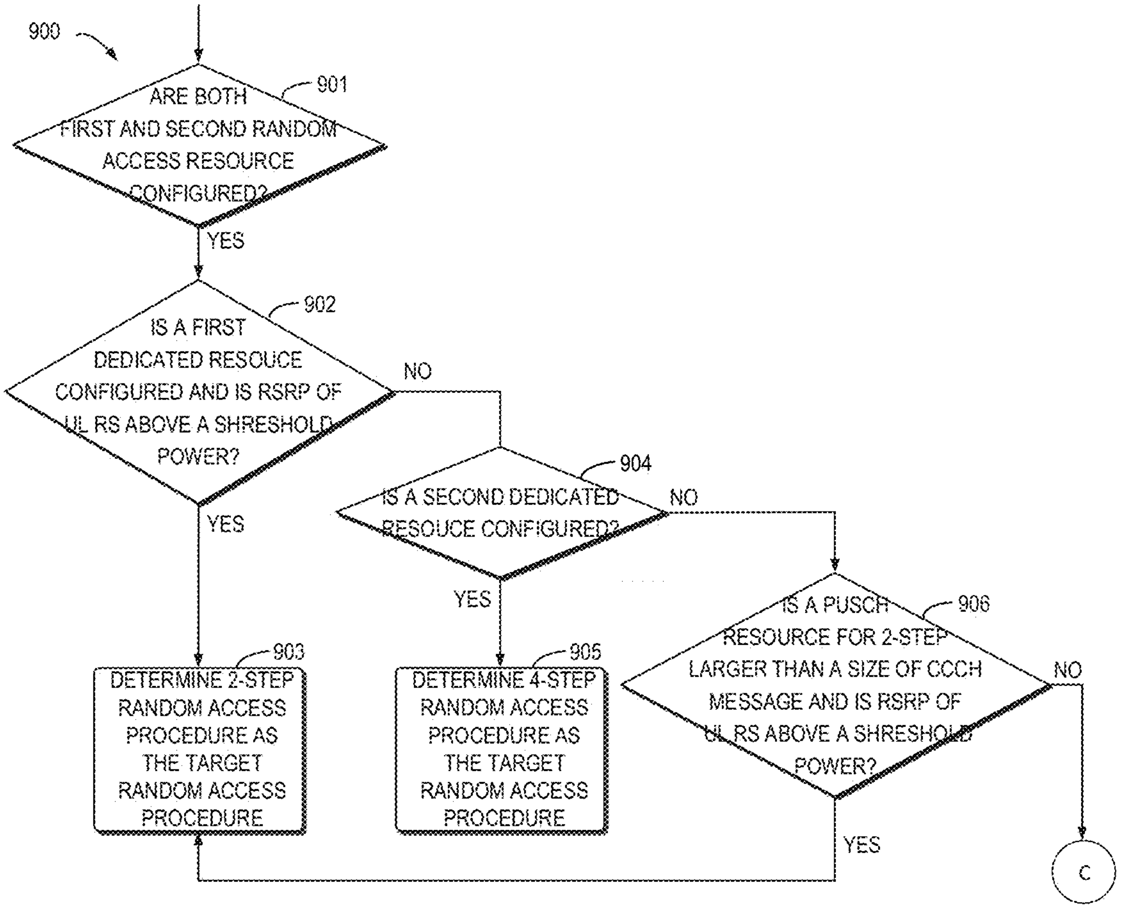
FIG. 9A-9B illustrate another example method of determining a target random access procedure without a packet size in accordance with some embodiments of the present disclosure.
Figure 9B:
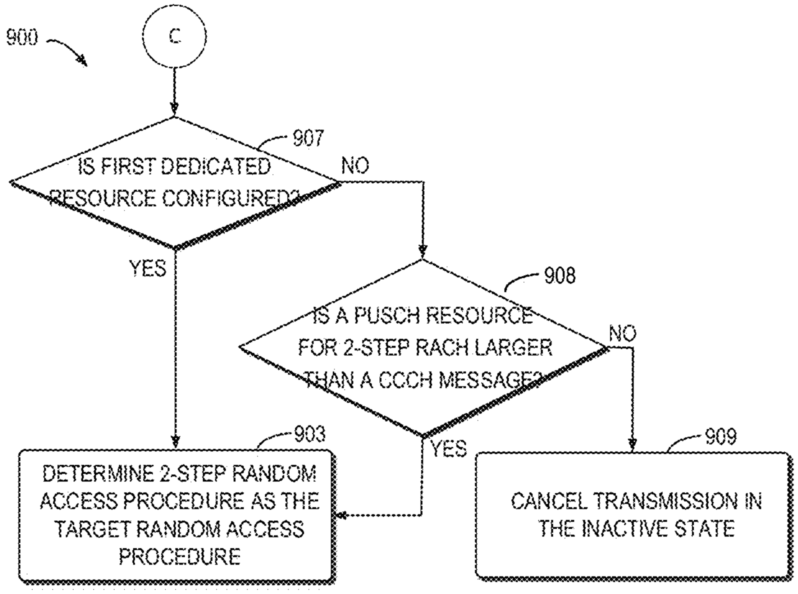

FIGS. 9A-9B illustrate another example method 900 of determining a target random access procedure without a packet size in accordance with some embodiments of the present disclosure. For example, the method 900 may be performed at the terminal device 120 as shown in FIG. 1. For the purpose of discussion, in the following, the method 900 will be described with reference to FIG. 1. It is to be understood that the method 900 may include additional blocks not shown and/or may omit some blocks as shown, and the scope of the present disclosure is not limited in this regard. This embodiment is described mainly for the case that both a first random access resource for a 2-step random access procedure and a second random access resource for a 4-step random access procedure are configured.

As shown in FIG. 9A, at block 901, the terminal device 120 may determine whether both a first random access resource for a 2-step random access procedure and a second random access resource for a 4-step random access procedure are configured for a selected BWP. If determining that both the first and second random access resources are configured, at block 902, the terminal device 120 may determine whether a first dedicated resource in the first random access resource is configured for the transmission of the uplink data in the inactive state and reference signal receiving power (RSRP) of a downlink reference signal (DL RS) is above a threshold power. Comparing with the operation at block 602 in FIG. 6A, there is no any limitation for the size of the first dedicated resource in the operation at block 902.

If determining at block 902 that the first dedicated resource is configured and the RSRP is above the threshold power, at block 903, the terminal device 120 may determine a 2-step random access procedure as the target random access procedure. If determining at block 902 that the first dedicated resource is not configured or the RSRP is below the threshold power, at block 904, the terminal device 120 may determine whether a second dedicated resource in the second random access resource is configured for the transmission of the uplink data in the inactive state. Comparing with the operation at block 604 in FIG. 6A, there is no any limitation for the size of the second dedicated resource in the operation at block 904.

If determining at block 904 that the second dedicated resource is configured, at block 905, the terminal device may determine a 4-step random access procedure as the target random access procedure. If determining at block 904 that the second dedicated resource is not configured, at block 906, the terminal device 120 may determine whether a size of a PUSCH resource for a 2-step random access procedure for the selected BWP is larger than a size of a CCCH message and the RSRP of the downlink reference signal is above the threshold power. Comparing with the operation at block 606 in FIG. 6A, instead of a packet size of the uplink data, a size of a CCCH message is used to assist determination of the target random access procedure in the operation at block 906.

If determining at block 906 that the size of the PUSCH resource is larger than the size of the CCCH message and the RSRP is above the threshold power, the process may enter block 903 in which the terminal device 120 may determine a 2-step random access procedure as the target random access procedure. If determining at block 906 that the size of the PUSCH resource is less than or equal to the size of the CCCH message or the RSRP is below the threshold power, as shown in FIG. 9B, terminal device 120 may determine, at block 907, whether a first dedicated resource in the first random access resource is configured for the transmission of the uplink data in the inactive state. Comparing with the operation at block 607 in FIG. 6B, there is no any limitation for the size of the first dedicated resource in the operation at block 907.

If determining at block 907 that the first dedicated resource is configured, the process may enter block 903 in which the terminal device 120 may determine a 2-step random access procedure as the target random access procedure. If determining at block 907 that the first dedicated resource is not configured, at block 908, the terminal device 120 may determine whether a size of a PUSCH resource for the 2-step random access procedure for the selected BWP is larger than a size of a CCCH message.

If determining at block 908 that the size of the PUSCH resource is larger than the size of the CCCH message, the process may enter block 903 in which the terminal device 120 may determine a 2-step random access procedure as the target random access procedure. If determining at block 908 that the size of the PUSCH resource is less than or equal to the size of the CCCH message, at block 909, the terminal device 120 may cancel the transmission of the uplink data in the inactive state.

In an alternative embodiment, the operation at block 907 and the operation at block 908 can be reversed in order of the performance. That is, the determination at block 908 may be performed first and then the determination at block 907 is performed. It should be noted that the embodiments described in connection with FIGS. 7-9B are merely examples, and may be combined in any suitable ways for determination of a target random access procedure.

Transmission of Uplink Data Based on RACH with Packet Size

Figure 10:
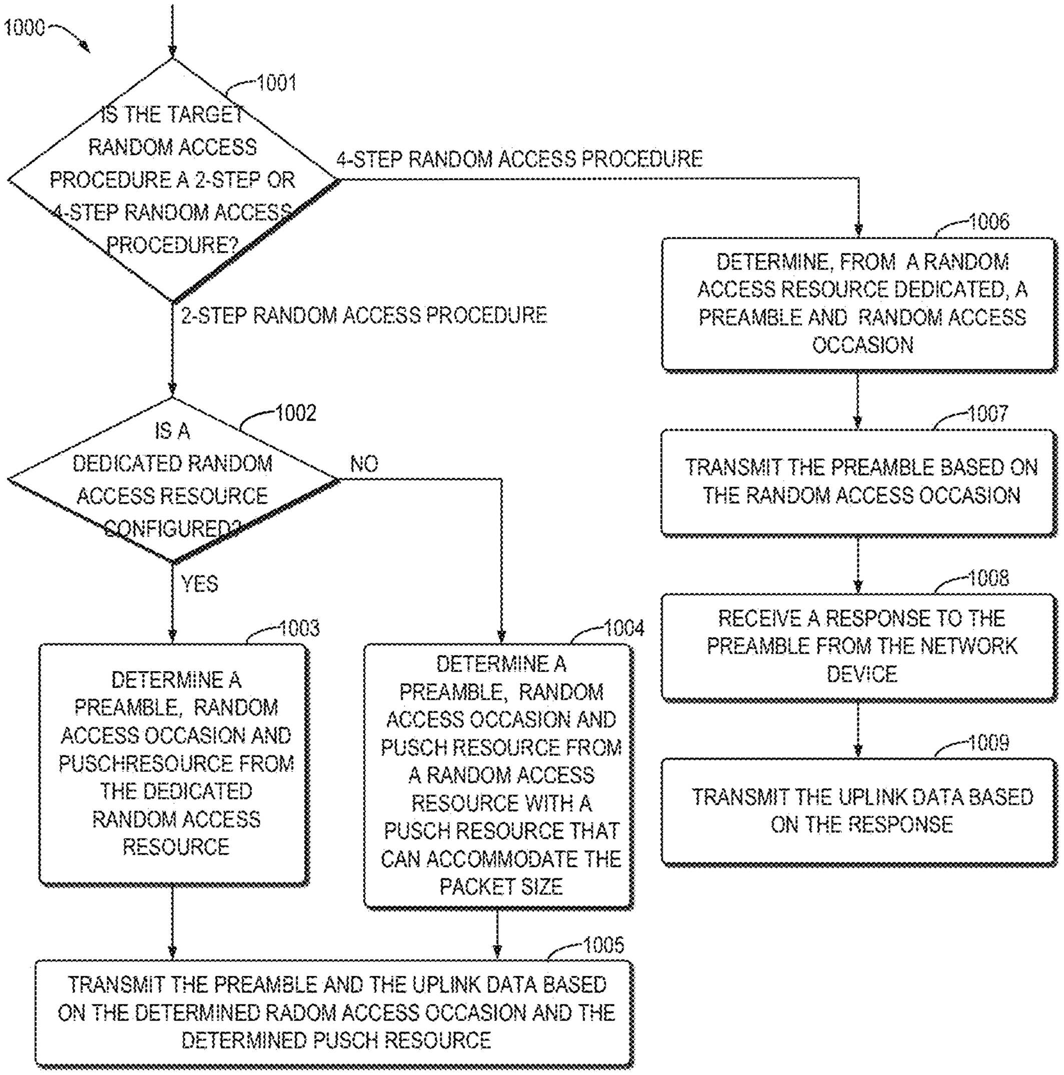
FIG. 10 illustrates an example method of transmitting uplink data based on a target random access procedure with a packet size in accordance with some embodiments of the present disclosure.

FIG. 10 illustrates an example method 1000 of transmitting uplink data based on a target random access procedure with a packet size in accordance with some embodiments of the present disclosure. For example, the method 1000 may be performed at the terminal device 120 as shown in FIG. 1. For the purpose of discussion, in the following, the method 1000 will be described with reference to FIG. 1. It is to be understood that the method 1000 may include additional blocks not shown and/or may omit some blocks as shown, and the scope of the present disclosure is not limited in this regard. This embodiment is described mainly for the case that a packet size of uplink data is considered.

As shown in FIG. 10, at block 1001, the terminal device 120 may determine whether the target random access procedure is a 2-step or 4-step random access procedure. For example, the terminal device 120 may perform the determination by any of methods 400-900 described in connection with FIGS. 4-9B.

If determining that the target random access procedure is a 2-step random access procedure, the process may enter block 1002. At block 1002, the terminal device 120 may determine whether a dedicated random access resource is configured for the transmission of the uplink data in the inactive state (i.e., SDT). In some embodiments, the terminal device 120 may determine whether the dedicated random access resource has a size corresponding to a packet size of the uplink data, and in accordance with a determination that the dedicated random access resource has a size corresponding to a packet size of the uplink data, the terminal device 120 may determine that the dedicated random access resource is configured. It should be noted that this is merely an example, any other suitable ways for determining whether the dedicated random access resource is configured are also feasible.

If determining at block 1002 that the dedicated random access resource is configured, at block 1003, the terminal device 120 may determine, from the dedicated random access resource, a preamble, a random access occasion and a PUSCH resource. According to embodiments of the present disclosure, a random access resource herein may comprise a RACH resource and a PUSCH resource. The RACH resource may comprise a preamble and a time and frequency resource. Thus, based on the dedicated random access resource for SDT, the terminal device 120 can determine the corresponding preamble, random access occasion and PUSCH resource for SDT.

If determining at block 1002 that the dedicated random access resource is not configured, at block 1004, the terminal device 120 may determine the preamble, the random access occasion and the PUSCH resource from a random access resource with a PUSCH resource that can accommodate a packet size of the uplink data.

Upon determining the preamble, the random access occasion and the PUSCH resource, at block 1005, the terminal device 120 may transmit the preamble and the uplink data based on the determined random access occasion and the determined PUSCH resource. This may correspond to transmission of message A in a 2-step random access procedure. In this way, the uplink data is transmitted in the inactive state based on the 2-step random access procedure.

If determining at block 1001 that the target random access procedure is a 4-step random access procedure, the process may enter block 1006. At block 1006, the terminal device 120 may determine a preamble and a random access occasion from a random access resource dedicated for the transmission of the uplink data in the inactive state. In some embodiments, the terminal device 120 may determine whether the random access resource has a size corresponding to a packet size of the uplink data, and in accordance with a determination that the random access resource has a size corresponding to a packet size of the uplink data, the terminal device 120 may determine that the random access resource is configured. It should be noted that this is merely an example, any other suitable ways for determining whether the random access resource is configured are also feasible.

At block 1007, the terminal device 120 may transmit the preamble based on the random access occasion. At block 1008, the terminal device 120 may receive a response to the preamble from the network device. In some embodiments, the response may comprise uplink grant information for transmission of the uplink data. At block 1009, the terminal device 120 may transmit the uplink data based on the response. In this way, the uplink data is transmitted in the inactive state based on the 4-step random access procedure.

Transmission of Uplink Data Based on RACH without Packet Size

Figure 11A:
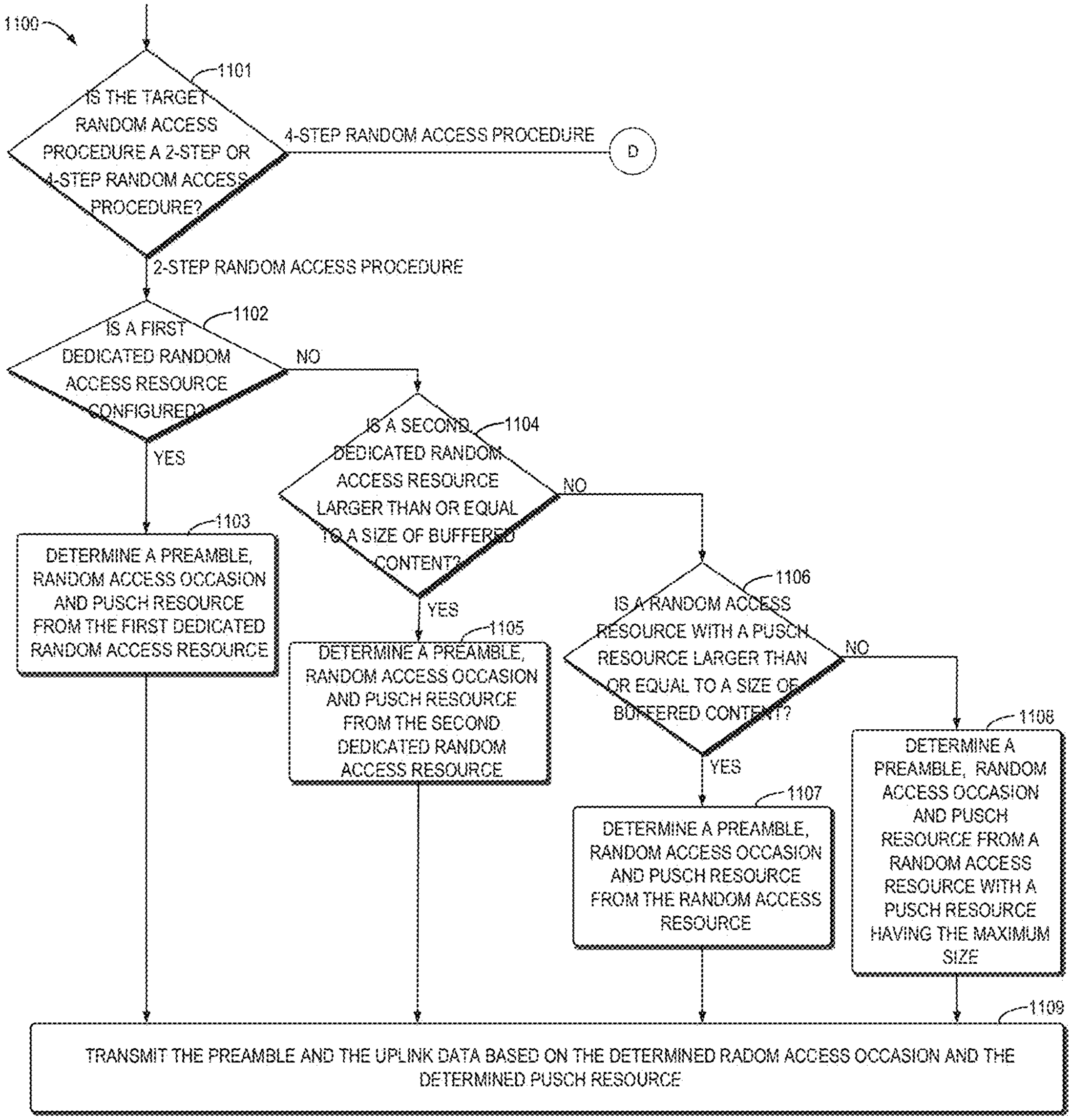
FIGS. 11A-11B illustrate an example method of transmitting uplink data based on a target random access procedure without a packet size in accordance with some embodiments of the present disclosure.
Figure 11B:
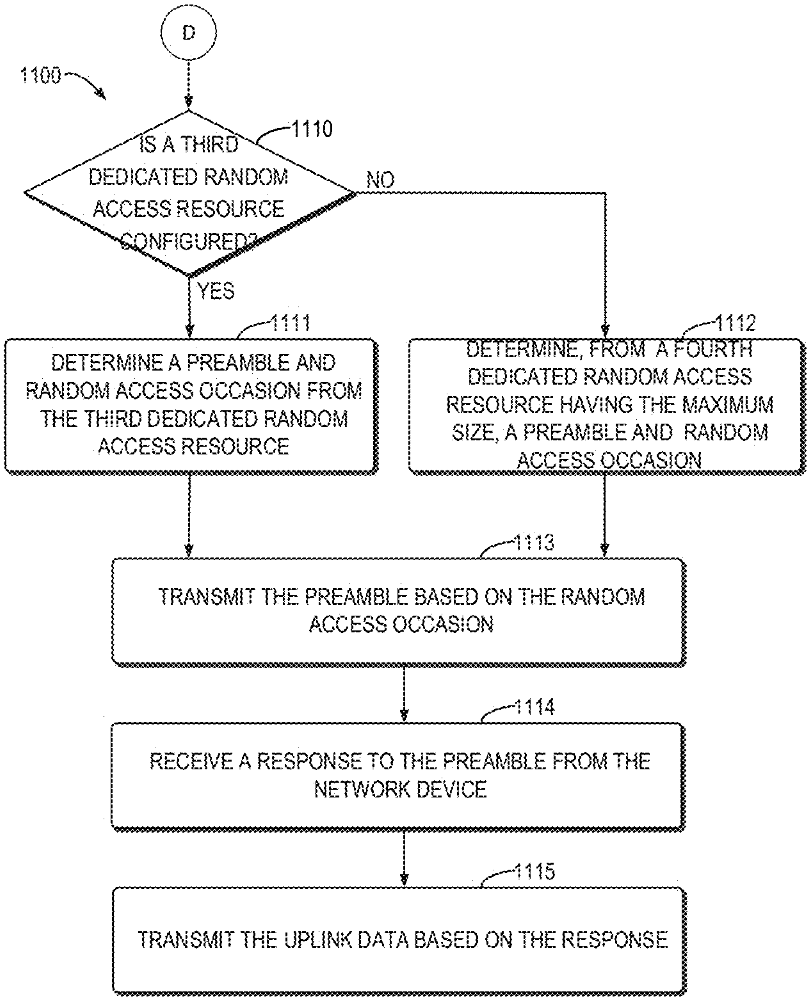

FIGS. 11A-11B illustrate an example method 1100 of transmitting uplink data based on a target random access procedure without a packet size in accordance with some embodiments of the present disclosure. For example, the method 1100 may be performed at the terminal device 120 as shown in FIG. 1. For the purpose of discussion, in the following, the method 1100 will be described with reference to FIG. 1. It is to be understood that the method 1100 may include additional blocks not shown and/or may omit some blocks as shown, and the scope of the present disclosure is not limited in this regard. This embodiment is described mainly for the case that a packet size of uplink data is considered.

As shown in FIG. 11A, at block 1101, the terminal device 120 may determine whether the target random access procedure is a 2-step or 4-step random access procedure. For example, the terminal device 120 may perform the determination by any of methods 400-900 described in connection with FIGS. 4-9B.

If determining that the target random access procedure is a 2-step random access procedure, the process may enter block 1102. At block 1102, the terminal device 120 may determine whether a first dedicated random access resource is configured for the transmission of the uplink data in the inactive state (i.e., SDT). In some embodiments, the terminal device 120 may determine whether the first dedicated random access resource has a size larger than or equal to a size of buffered content associated with the uplink data, and in accordance with a determination that the first dedicated random access resource has a size larger than or equal to the size of the buffered content, the terminal device 120 may determine that the first dedicated random access resource is configured.

In some embodiments, the terminal device 120 may determine whether there is a dedicated resource A that has a size equal to the size of the buffered content, and in accordance with a determination that there is the dedicated resource A, the terminal device 120 may determine the dedicated resource A as the first dedicated random access resource. In accordance with a determination that there is no dedicated resource A, the terminal device may determine whether there is a dedicated resource B that has a size larger than the size of the buffered content. In accordance with a determination that there is the dedicated resource B, the terminal device 120 may determine the dedicated resource B as the first dedicated random access resource. In accordance with a determination that there is no dedicated resource B, the terminal device 120 may determine that the first dedicated random access resource is not configured. It should be noted that this is merely an example, any other suitable ways for determining whether the first dedicated random access resource is configured are also feasible.

If determining at block 1102 that the first dedicated random access resource is configured, at block 1103, the terminal device 120 may determine, from the first dedicated random access resource, a preamble, a random access occasion and a PUSCH resource. If determining at block 1102 that the first dedicated random access resource is not configured, at block 1104, the terminal device 120 may determine whether a second dedicated random access resource is larger than or equal to the size of the buffered content, the second dedicated random access resource among random access resources configured for the transmission of the uplink data in the inactive state.

If determining at block 1104 that the second dedicated random access resource is larger than or equal to the size of the buffered content, at block 1105, the terminal device 120 may determine the preamble, the random access occasion and the PUSCH resource from the second dedicated random access resource. If determining at block 1104 that the second dedicated random access resource is less than the size of the buffered content, at block 1106, the terminal device 120 may determine whether a random access resource with a PUSCH resource that is larger than or equal to the size of the buffered content is configured.

If determining at block 1106 that the random access resource is configured, at block 1107, the terminal device 120 may determine the preamble, the random access occasion and the PUSCH resource from the random access resource. If determining at block 1106 that the random access resource is not configured, at block 1108, the terminal device 120 may determine the preamble, the random access occasion and the PUSCH resource from a random access resource with a PUSCH resource that has the maximum size among PUSCH resources in random access resources configured for the 2-step random access procedure.

Upon determining the preamble, the random access occasion and the PUSCH resource, at block 1109, the terminal device 120 may transmit the preamble and the uplink data based on the determined random access occasion and the determined PUSCH resource. In this way, the uplink data is transmitted in the inactive state based on the 2-step random access procedure.

If determining at block 1101 that the target random access procedure is a 4-step random access procedure, the process may enter block 1110 shown in FIG. 11B. At block 1110, the terminal device 120 may determine whether a third dedicated random access resource is configured for the transmission of the uplink data in the inactive state, the third dedicated random access resource having a size larger than or equal to a size of buffered content associated with the uplink data.

If determining at block 1110 that the third dedicated random access resource is configured, at block 1111, the terminal device 120 may determine a preamble and a random access occasion from the third dedicated random access resource. If determining at block 1110 that the third dedicated random access resource is not configured, at block 1112, the terminal device 120 may determine a preamble and a random access occasion from a fourth dedicated random access resource having the maximum size among random access resources configured for the transmission of the uplink data in the inactive state.

Upon determining the preamble and the random access occasion, at block 1113, the terminal device 120 may transmit the preamble based on the random access occasion. At block 1114, the terminal device 120 may receive a response to the preamble from the network device. At block 1115, the terminal device 120 may transmit the uplink data based on the response. In this way, the uplink data is transmitted in the inactive state based on the 4-step random access procedure.

So far, random access initialization and resource selection considering SDT is described. The following description will be made on SDT control in a fallback procedure from a 2-step random access procedure to a 4-step random access procedure.

Fallback Procedure in SDT Based on RACH

Currently, for a 2-step random access procedure, if a maximum number (i.e. msgA-TransMax) of message A transmissions when both 4-step and 2-step random access resources is configured, and if the random access procedure is not successfully completed even after transmitting the message A for msgA-TransMax times, the terminal device 120 may fallback to a 4 step random access procedure, and then perform the 4-step random access procedure. However, if there is no dedicated 4-step random access resource for SDT, the current procedure will break down. In view of this, embodiments of the present disclosure provide solutions to solve the above issue. It will be described below in connection with FIGS. 12-14.

Figure 12:
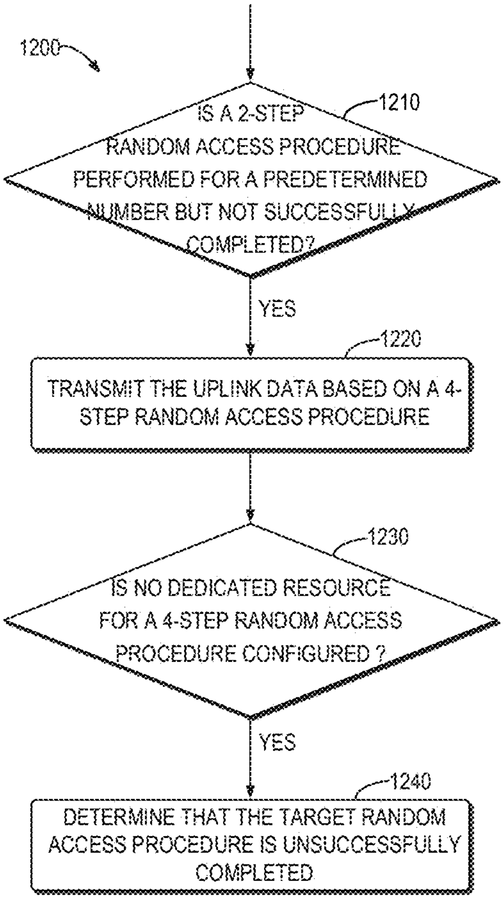
FIG. 12 illustrates an example method of switching from a 2-step random access procedure to a 4-step random access procedure in accordance with some embodiments of the present disclosure.

FIG. 12 illustrates an example method 1200 of switching from a 2-step random access procedure to a 4-step random access procedure in accordance with some embodiments of the present disclosure. For example, the method 1200 may be performed at the terminal device 120 as shown in FIG. 1. For the purpose of discussion, in the following, the method 1200 will be described with reference to FIG. 1. It is to be understood that the method 1200 may include additional blocks not shown and/or may omit some blocks as shown, and the scope of the present disclosure is not limited in this regard.

In case that the target random access procedure is determined to be a 2-step random access procedure, as shown in FIG. 12, at block 1210, the terminal device 120 may determine whether the 2-step random access procedure is performed for a predetermined number but not successfully completed. In some embodiments, the predetermined number may be determined in any suitable ways, and the present disclosure does not make a limitation for this.

If determining that the 2-step random access procedure is performed for a predetermined number but not successfully completed, at block 1220, the terminal device 120 may transmit the uplink data based on a 4-step random access procedure. In some embodiments in which a packet size is considered, at block 1230, the terminal device may determine, in the 4-step random access procedure (for example, when transmitting message A), whether no dedicated resource having a size corresponding to a packet size of the uplink data is configured for the transmission of the uplink data in the inactive state. In an alternative embodiment in which the packet size is not considered, the terminal device may determine, in the 4-step random access procedure, whether no dedicated resource is configured for the transmission of the uplink data in the inactive state, regardless the size of the dedicated resource.

If determining at block 1230 that no dedicated resource is configured, at block 1240, the terminal device 120 may determine that the target random access procedure is unsuccessfully completed. In this way, the random access procedure can be ended and the breakdown of the procedure can be avoided.

Figure 13:
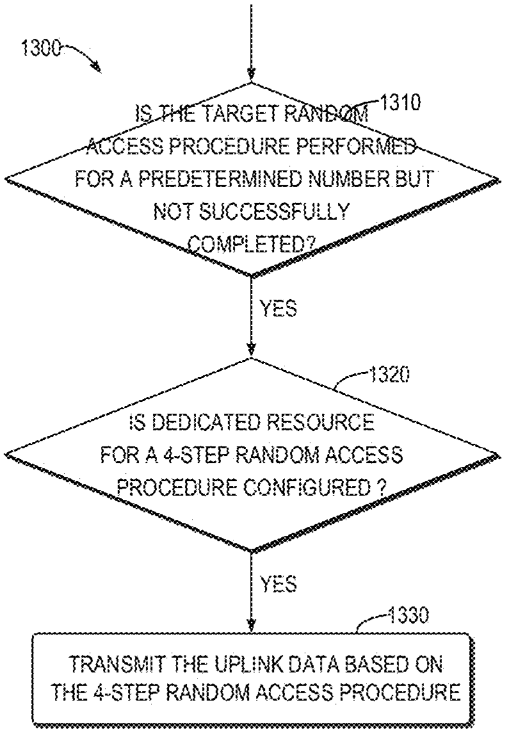
FIG. 13 illustrates another example method of switching from a 2-step random access procedure to a 4-step random access procedure in accordance with some embodiments of the present disclosure.

FIG. 13 illustrates another example method 1300 of switching from a 2-step random access procedure to a 4-step random access procedure in accordance with some embodiments of the present disclosure. For example, the method 1300 may be performed at the terminal device 120 as shown in FIG. 1. For the purpose of discussion, in the following, the method 1300 will be described with reference to FIG. 1. It is to be understood that the method 1300 may include additional blocks not shown and/or may omit some blocks as shown, and the scope of the present disclosure is not limited in this regard.

In case that the target random access procedure is determined to be a 2-step random access procedure, as shown in FIG. 13, at block 1310, the terminal device 120 may determine whether the 2-step random access procedure is performed for a predetermined number but not successfully completed. In some embodiments, the predetermined number may be determined in any suitable ways, and the present disclosure does not make a limitation for this.

If determining that the 2-step random access procedure is performed for a predetermined number but not successfully completed, the process may enter block 1320. In some embodiments in which a packet size is considered, at block 1320, the terminal device 120 may determine whether a dedicated resource having a size corresponding to a packet size of the uplink data for a 4-step random access procedure is configured for the transmission of the uplink data in the inactive state. In an alternative embodiment in which the packet size is not considered, the terminal device may determine whether a dedicated resource for a 4-step random access procedure is configured for the transmission of the uplink data in the inactive state, regardless the size of the dedicated resource.

If determining at block 1320 that the dedicated resource is configured, at block 1330, the terminal device 120 may transmit the uplink data based on the 4-step random access procedure. In this way, the determination about whether a dedicated resource for a 4-step random access procedure is configured is made before switching to the 4-step random access procedure, and thus a more efficient random access procedure for SDT can be achieved and the breakdown of the procedure is avoided surely.

Figure 14:
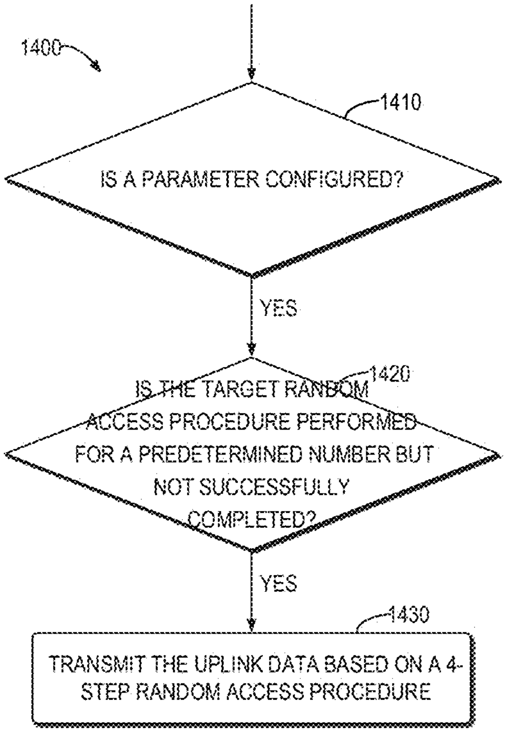
FIG. 14 illustrates another example method of switching from a 2-step random access procedure to a 4-step random access procedure in accordance with some embodiments of the present disclosure.

FIG. 14 illustrates another example method 1400 of switching from a 2-step random access procedure to a 4-step random access procedure in accordance with some embodiments of the present disclosure. For example, the method 1400 may be performed at the terminal device 120 as shown in FIG. 1. For the purpose of discussion, in the following, the method 1400 will be described with reference to FIG. 1. It is to be understood that the method 1400 may include additional blocks not shown and/or may omit some blocks as shown, and the scope of the present disclosure is not limited in this regard.

In case that the target random access procedure is determined to be a 2-step random access procedure, as shown in FIG. 14, at block 1410, the terminal device 120 may determine whether a parameter is configured. The parameter indicates a predetermined number for which the target random access procedure is performed upon not successfully completed in case that the target random access procedure is the 2-step random access procedure. In some embodiments, the parameter may be newly defined for SDT. It should be noted that the parameter can be determined in any other suitable ways.

If determining at block 1410 that the parameter is configured, at block 1420, the terminal device 120 may determine whether the target random access procedure (i.e., 2-step random access procedure) is performed for the predetermined number but not successfully completed. If determining at block 1420 that the 2-step random access procedure is performed for the predetermined number but not successfully completed, at block 1430, the terminal device 120 may transmit the uplink data based on the 4-step random access procedure. In this way, the fallback from a 2-step to a 4-step random access procedure is simply controlled and the breakdown of the procedure is avoided surely.

Figure 15:
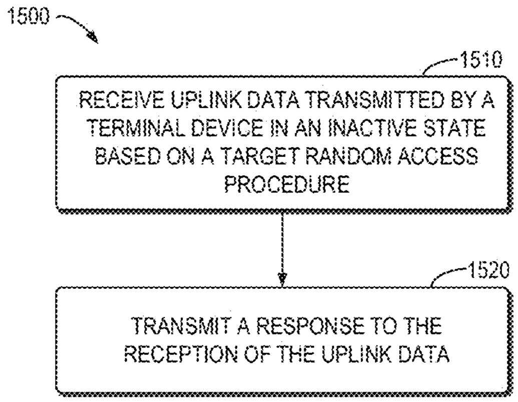
FIG. 15 illustrates an example method of communication implemented at a network device in accordance with some embodiments of the present disclosure.

Correspondingly, embodiments of the present disclosure also provide a method of communication implemented at a network device. FIG. 15 illustrates an example method 1500 of communication implemented at a network device in accordance with some embodiments of the present disclosure. For example, the method 1500 may be performed at the network device 110 as shown in FIG. 1. For the purpose of discussion, in the following, the method 1500 will be described with reference to FIG. 1. It is to be understood that the method 1500 may include additional blocks not shown and/or may omit some blocks as shown, and the scope of the present disclosure is not limited in this regard.

As shown in FIG. 15, at block 1510, the network device 110 receives uplink data transmitted by the terminal device 120 in an inactive state based on a target random access procedure. The target random access procedure is determined based on configuration parameters and the configuration parameters is determined upon determination that uplink data is to be transmitted in the inactive state.

In some embodiments, the network device 110 may transmit, to the terminal device 120, information about a RACH resource dedicated for the transmission of the uplink data in the inactive state. In this case, the network device 110 may receive the uplink data transmitted based on the RACH resource. In some embodiments, the RACH resource is a set of resources, resources in the set having sizes corresponding to different uplink grant sizes.

In some embodiments, the network device 110 may transmit, to the terminal device 120, information about a PUSCH resource dedicated for the transmission of the uplink data in the inactive state during a 2-step random access procedure. In this case, the network device 110 may receive the uplink data transmitted based on the PUSCH resource. In some embodiments, the PUSCH resource is a set of resources, resources in the set having sizes corresponding to different uplink grant sizes.

At block 1520, the network device 110 may transmit, to the terminal device 120, a response to the reception of the uplink data. In some embodiments, the response may comprise configured grant information for subsequent transmission of the uplink data. In some embodiments, the response may indicate to the terminal device 120 to suspend configuration for transmission of the uplink data in the inactive state.

In some embodiments, the network device 110 may transmit, to the terminal device 120, information about a packet size for transmission of the uplink data in the inactive state. In some embodiments, the information about the packet size may be transmitted via system information. In some alternative embodiments, the information about the packet size may be configured to the terminal device 120 via a RRC message. It should be noted that such information about the packet size also can be transmitted to the terminal device 120 in any other suitable ways.

In some embodiments, the packet size may be associated with at least one of an access category, an access identity, a QoS parameter, and a data radio bearer for the uplink data.

In some embodiments in which both 2-step and 4-step random access procedures are configured and a dedicated resource having a size corresponding to a packet size of the uplink data is configured for the transmission of the uplink data in the inactive state in a 4-step random access procedure, the network device 110 may configure a parameter to the terminal device, the parameter indicating a predetermined number for which the target random access procedure is performed upon not successfully completed in case that the target random access procedure is a 2-step random access procedure. In this way, the fallback from a 2-step to a 4-step random access procedure is simply controlled and the breakdown of the procedure is avoided surely.

Figure 16:
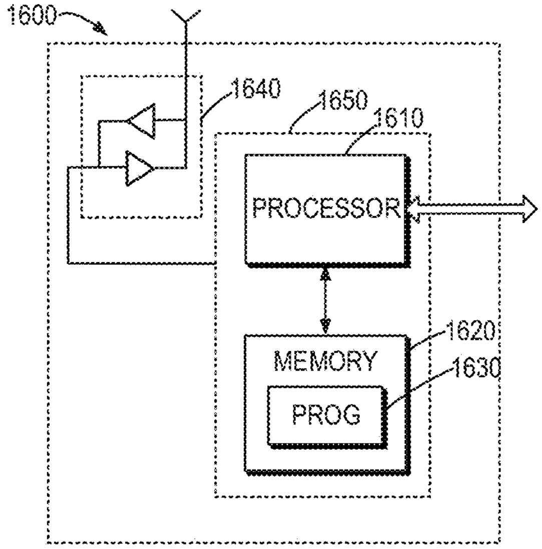
FIG. 16 is a simplified block diagram of a device that is suitable for implementing embodiments of the present disclosure.

FIG. 16 is a simplified block diagram of a device 1600 that is suitable for implementing embodiments of the present disclosure. The device 1600 can be considered as a further example implementation of the network device 110 or the terminal device 120 as shown in FIG. 1. Accordingly, the device 1600 can be implemented at or as at least a part of the network device 110 or the terminal device 120.

As shown, the device 1600 includes a processor 1610, a memory 1620 coupled to the processor 1610, a suitable transmitter (TX) and receiver (RX) 1640 coupled to the processor 1610, and a communication interface coupled to the TX/RX 1640. The memory 1610 stores at least a part of a program 1630. The TX/RX 1640 is for bidirectional communications. The TX/RX 1640 has at least one antenna to facilitate communication, though in practice an Access Node mentioned in this application may have several ones.

The communication interface may represent any interface that is necessary for communication with other network elements, such as X2/Xn interface for bidirectional communications between eNBs/gNBs, S1/NG interface for communication between a Mobility Management Entity (MME)/Access and Mobility Management Function (AMF)/SGW/UPF and the eNB/gNB, Un interface for communication between the eNB/gNB and a relay node (RN), or Uu interface for communication between the eNB/gNB and a terminal device.

The program 1630 is assumed to include program instructions that, when executed by the associated processor 1610, enable the device 1600 to operate in accordance with the embodiments of the present disclosure, as discussed herein with reference to FIGS. 1 to 15. The embodiments herein may be implemented by computer software executable by the processor 1610 of the device 1600, or by hardware, or by a combination of software and hardware. The processor 1610 may be configured to implement various embodiments of the present disclosure. Furthermore, a combination of the processor 1610 and memory 1620 may form processing means 1650 adapted to implement various embodiments of the present disclosure.

The memory 1620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1620 is shown in the device 1600, there may be several physically distinct memory modules in the device 1600. The processor 1610 may be of any type suitable to the local technical network, and may include one or more of general purpose computers, special purpose computers, microprocessors, digital signal processors (DSPs) and processors based on multicore processor architecture, as non-limiting examples. The device 1600 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2 to 15. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, the method comprising:

determining, by a media access control (MAC) layer, a size of uplink data, based on information from a radio resource control (RRC) layer of the terminal device, the information comprising identity(s) (ID(s)) of a data radio bearer (DRB) for small data transmission (SDT);

determining whether the size of the uplink data is less than or equal to a threshold, the threshold being configured for the terminal device to determine whether to perform a SDT procedure;

in response to determining that the size of the uplink data is larger than the threshold, indicating, by the MAC layer, to the RRC layer, that SDT is not to be performed;

in response to determining that the size of the uplink data is less than or equal to the threshold:

performing a selection of an uplink carrier, from a normal uplink (NUL) carrier and a supplement uplink (SUL) carrier, for transmission of the uplink data in an inactive state in the SDT procedure; and initiating the SDT procedure in response to using random access resources for SDT on a selected uplink carrier.

2. The method of claim 1, wherein the random access resources for the SDT are at least one of 2-step random access resources and 4-step random access resources.

3. The method of claim 1, wherein the uplink data includes data and signalling.

4. A terminal device comprising a processor configured to:

determining, by a media access control (MAC) layer, a size of uplink data, based on information from a radio resource control (RRC) layer of the terminal device, the information comprising identity(s) (ID(s)) of a data radio bearer (DRB) for small data transmission (SDT);

determine whether the size of the uplink data is less than or equal to a threshold, the threshold being configured for the terminal device to determine whether to perform a SDT procedure;

in response to determining that the size of the uplink data is larger than the threshold, indicate, by the MAC layer, to the RRC layer, that SDT is not to be performed;

in response to determining that the size of the uplink data is less than or equal to the threshold:

perform a selection of an uplink carrier, from a normal uplink (NUL) carrier and a supplement uplink (SUL) carrier, for transmission of the uplink data in an inactive state in the SDT procedure; and initiate the SDT procedure in response to using random access resources for SDT on a selected uplink carrier.

5. The terminal device of claim 4, wherein the random access resources for the SDT are at least one of 2-step random access resources and 4-step random access resources.

6. The terminal device of claim 4, wherein the uplink data includes data and signalling.

* * * * *